Figure 1:
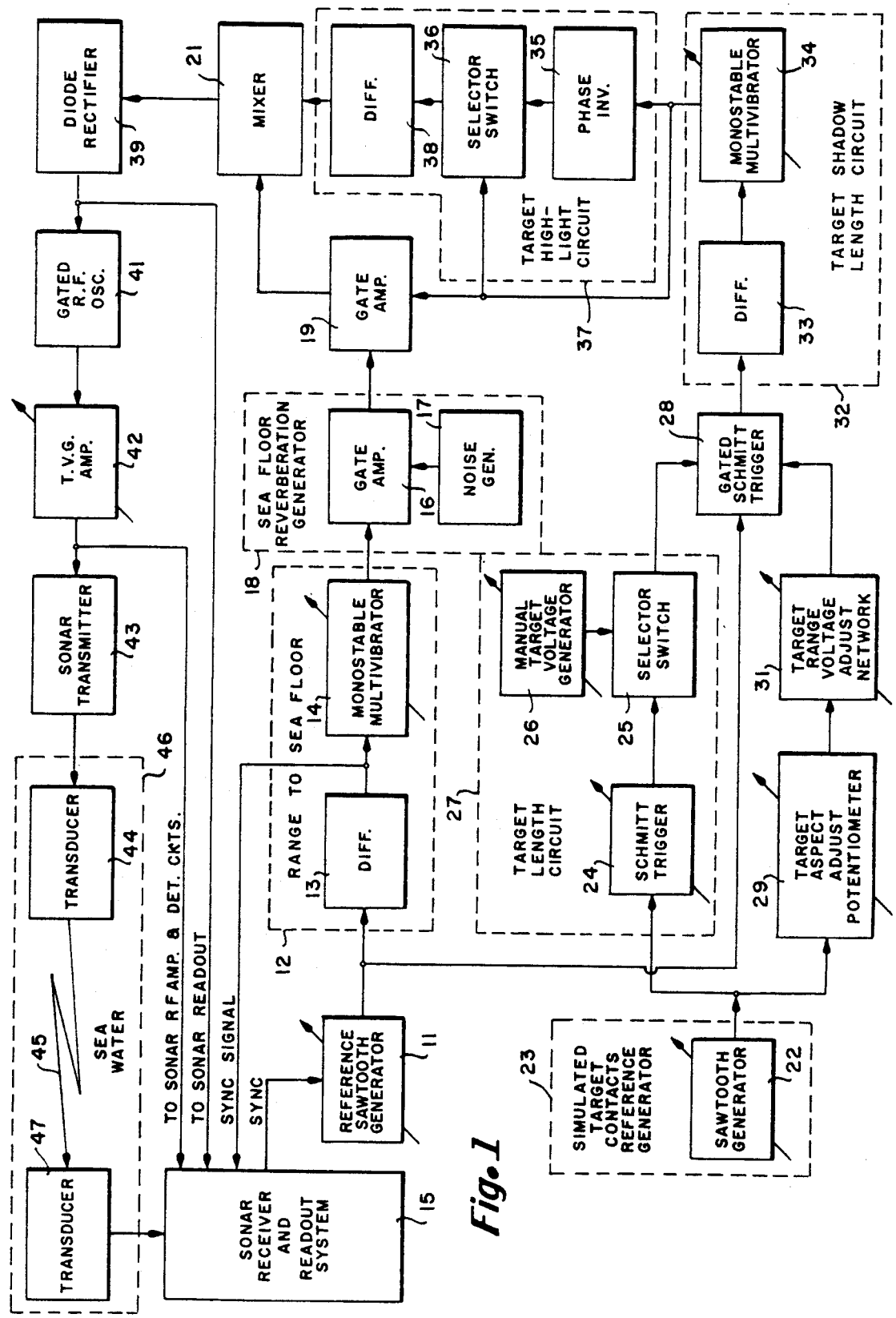

United States Patent [19]

Harris, Jr.

[11] Patent Number: 4,972,379

[45] Date of Patent: Nov. 20, 1990

[54] SONIC ECHO SIMULATOR

[75] Inventor: William G. Harris, Jr., Panama City, Fla.

[73] Assignee: The United States of America as represented by the Secretary of the Navy, Washington, D.C.

[21] Appl. No.: 590,148

[22] Filed: Oct. 26, 1966

[51] Int. Cl.$^5$ .................. G01S 15/00; H04B 17/00
[52] U.S. Cl. ............................................ 367/13; 434/6
[58] Field of Search ........................................ 340/3–5; 35/10.4; 367/13; 434/6–10

[56] References Cited

U.S. PATENT DOCUMENTS 3,008,244 11/1961 Lindley, Jr. .............................. 434/8
3,153,770 10/1964 Feistman et al. ....................... 367/13

Primary Examiner—Thomas H. Tarcza
Assistant Examiner—Daniel T. Pihulic
Attorney, Agent, or Firm—Harvey David; John Becker; Sol Sheinbein

[57] ABSTRACT

A sonic echo simulator for simulating sonar signals reflected from underwater targets having a transmitter which broadcasts sonar signals through a given amount of water toward a receiver for readout thereat. Prior to broadcast, various characteristics, such as target length, target aspect, target shadow length, range to sea floor, sea floor reverberation, and target highlights are selectively incorporated into said broadcast sonar signals by combined circuits for the timely generation thereof, respectively.

14 Claims, 2 Drawing Sheets

SONIC ECHO SIMULATOR

The invention described herein may be manufactured and used by or for the Government of the United States of America for governmental purposes without the payment of any royalties thereon or therefor.

The present invention relates, in general, to underwater sound systems, and, in particular, it is an improved method and means for simulating sonar echo signals that have been reflected from various and sundry subaqueous targets and, thus, have signature characteristics similar thereto incorporated therein, respectively. In even greater particularity, the subject invention pertains to sonar training apparatus which facilitates giving instruction and practice to human operators in finding and identifying, both aurally and visually, the types of underwater targets that they will be attempting to find and identify during actual battle, mine or other object hunting, or other appropriate marine conditions.

In the past, target-echo simulators have been employed for the same purpose as that of this invention, and for many practical purposes, they have been quite satisfactory. However, such prior art devices usually receive directly the output of a sonar transmitter and then they inject a known delay therein, before it is fed back to a sonar receiver as an attenuated signal that is delayed in time with respect to the transmitted signal.

Instead of using the aforementioned sonar transmitter outputs, it is also known to generate signals somewhat similar to target echoes by means of electronic circuits and mechanical devices, but for the most part, the signals produced thereby leave a great deal to be desired from a fidelity standpoint, and, therefore, the actual training or other benefits effected thereby are somewhat questionable, to say the least.

Of course, real sonar systems and "planted" real targets have also been used for training purposes; and although this is perhaps the best of the prior art systems previously mentioned, it has its disadvantages, too, as a result of the fact that ships, submarines, and the like, are tied up during this time and cannot be used for their intended purposes; and, moreover, it is not always possible to obtain a real target of the type needed for effective training purposes.

The subject invention overcomes most of the disadvantages of the prior art devices, in that it produces a rather sophisticated simulation of known as well as conjectural target echoes, and does so with sufficiently improved fidelity that, for most practical purposes, considerably improved training results are effected.

In addition, the subject invention appears to be somewhat more versatile than the prior art echo simulators, inasmuch as it may be used to an advantage for purposes other than operator training purposes.

It is, therefore, an object of this invention to provide an improved target-echo simulator.

It is another object of this invention to provide a target-echo simulator which generates signals representing (1) time a transmitted echo-search-ranging pulse occurs, (2) the travel time to the sea floor, (3) ocean bottom reverberations, (4) and such target characteristics as length, aspect, range, target shadow length, and doppler, as desired.

Still another object of this invention is to provide an improved method and means for calibrating a high resolution echo-ranging sonar system and its automatic detection and classification equipment.

A further object of this invention is to provide an improved method and means for testing a sonar readout or display system.

A further object of this invention is to provide an improved method and means for training and expediting the training of human sonar operators to detect and classify submarine objects, whether they are submerged within the water somewhere above the sea floor, whether they are lying on the sea floor, or whether they are partially or totally buried below the sea floor.

Another object of this invention is to provide an improved method and means for troubleshooting a sonar system's operations and internal circuitry.

Another object of this invention is to provide a method and means for generating and intermingling target or object echo simulating signals with an improved degree of fidelity.

Another object of this invention is to provide an improved target echo simulator that may be easily and economically manufactured, operated, and maintained.

Figure 2:
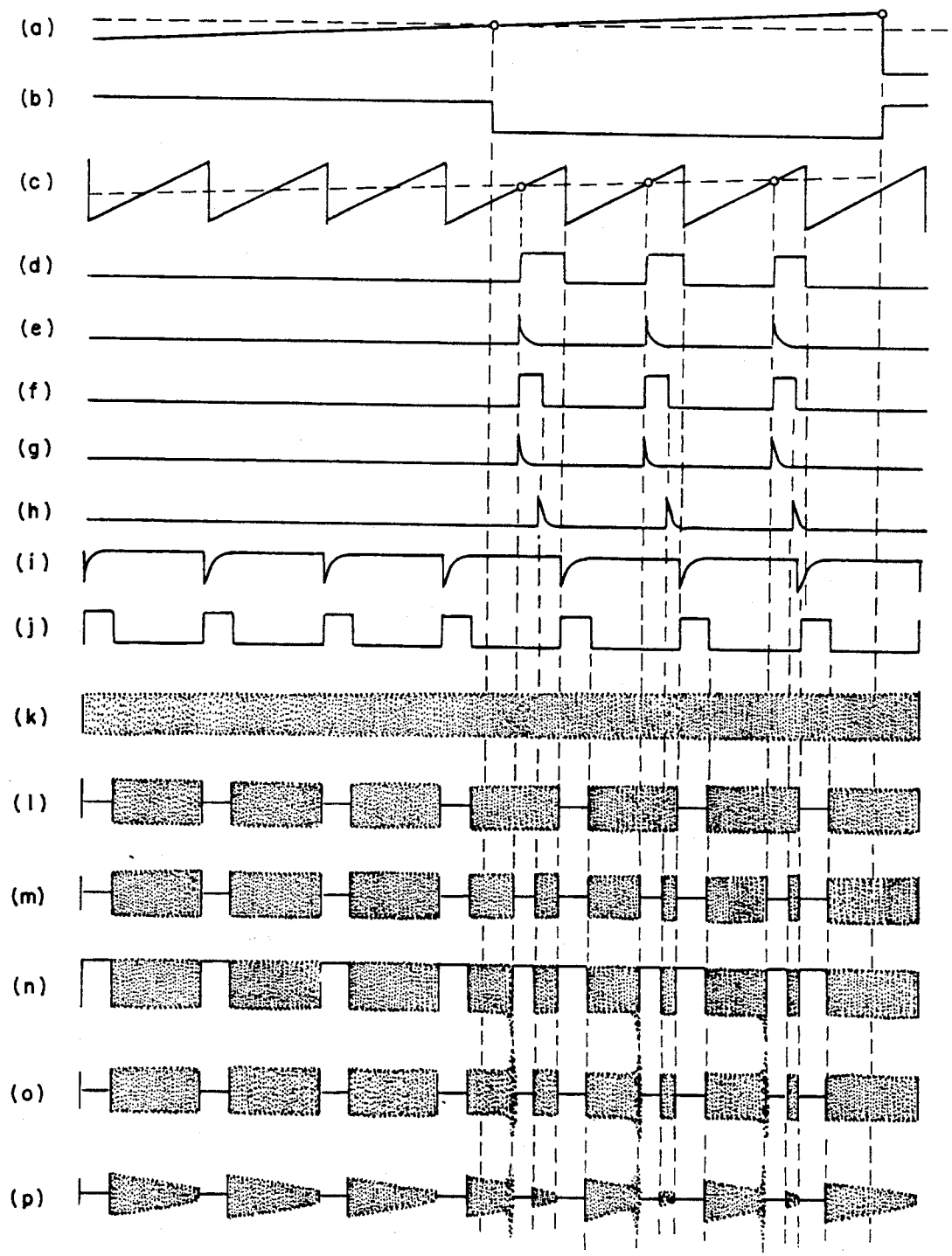

Other objects and many of the attendant advantages will be readily appreciated as the subject invention becomes better understood by reference to the following detailed description when considered in conjunction with the accompanying drawings wherein:

FIG. 1 is a block diagram of a preferred embodiment of the target-echo simulator system constituting this invention; and FIG. 2 is a graphical representation of idealized signal waveforms, which occur at the output of various elements of the device of FIG. 1, respectively.

Referring now to FIG. 1, the subject invention is shown as incorporating a master clock type of device, preferably in the form of a free-running reference sawtooth generator 11, the frequency of which and the sawtooth voltage amplitudes of which may be varied as desired.

The output of sawtooth generator 11 takes two electrical paths, or channels, one of which will be described subsequently, and the other of which includes a circuit 12 for simulating the range to the sea floor. In this case, the output of sawtooth generator 11 is actually coupled to the input of a differentiator 13, with the output thereof connected to the input of a variable monostable multivibrator 14. As may readily be seen, differentiator 13 and monostable multivibrator 14 combine to make up the aforesaid range to sea floor circuit 12.

The output pulse from differentiator 13 is also supplied as a synchronization signal to a sonar receiver and readout system 15 for the appropriate timing thereof in both the aural and visual display modes, as warranted by operational circumstances.

The output of monostable multivibrator 14, and hence the output of range to sea floor circuit 12, is connected to one of the inputs of a gate amplifier 16. The other input of gate amplifier 16 is coupled to the output of a band-limited noise generator 17. Noise generator 17 and gate amplifier 16, of course, combine to form a sea floor reverberation generator 18.

The output of sea floor reverberation generator 18 is taken from the output of gate amplifier 16 and is connected to one of the inputs of a gate amplifier 19, the output of which is connected to one of the inputs of a mixer 21.

Another variable free running sawtooth generator 22 is used as a device 23 for simulating a given number of target contacts. The frequency thereof should be so designed as to have a very long sawtooth period compared to that of the aforementioned reference sawtooth generator 11. The output thereof is coupled to the input of an adjustable Schmitt trigger 24, and the output of Schmitt trigger 24 is connected to one of the inputs of a selector switch 25. The other input to selector switch 25 is connected to the output of manual target generator 26.

Manual target generator 26 is, in fact, merely a fixed direct current voltage, which may be applied to the output of switch 25, whenever switch 25 is switched manually or otherwise to effect such condition. As such, it actually simulates a target for whatever length of time switch 25 is set for contact therewith.

Schmitt trigger 24 is, likewise, a device which supplies a voltage for a preselected period of time, but also at a predetermined repetition rate governed by the sawtooth voltage of the aforesaid sawtooth generator 22. However, during said preselected time period it produces a target simulation voltage.

Of course, as may readily be seen, Schmitt trigger 24, selector switch 25, and manual target generator 26 all combine to form a target length circuit 27. The output of target length circuit 27 is taken from the output of selector switch 25, and it is connected to a gated Schmitt trigger 28.

The output of the aforesaid sawtooth generator 22 is also connected to a variable potentiometer 29, which, in this particular instance, is adjustable in voltage amplitude, so as to change the simulated aspect of a target, as desired. The output of target aspect adjust potentiometer 29 is then connected to the input of an adjustable direct current voltage network herewith defined as a target range voltage adjust network 31. Adjustment, manually or otherwise, of this network causes the range of the simulated target to be changed, as desired. The output thereof is coupled to another of the inputs of gated Schmitt trigger 28.

Still another of the inputs of gated Schmitt trigger 28 is connected to the output of the aforesaid reference sawtooth generator 11 for response to the master sawtooth signal therefrom.

The output of gated Schmitt trigger 28 is connected to the input of a target shadow length controlling circuit 32, and actually to the input of a differentiator 33 thereof. An adjustable monostable multivibrator 34, also a part of target shadow length circuit 34, has its input connected to the output of differentiator 33 and its output connected to the inputs of a phase inverter 35, a selector switch 36 of a target highlight generating circuit 37, and the gating input of the aforesaid gate amplifier 19. The output of selector switch 36 is connected to the input of a differentiator 38, the output of which constitutes the output of target highlight circuit 37 and is connected to the other of the inputs of the aforementioned mixer 21.

The output of mixer 21 is connected to the input of a diode rectifier 39, the output of which is directly connected to the sonar display or readout circuit of sonar receiver and readout system 15 and to the input of gated radio frequency oscillator 41, which is tuned to the desired sonar transmitted frequency.

A variable reverse amplification time varied gain amplifier 42 (of the type wherein the gain is reduced with time) has its input connected to the output of oscillator 41, and its output is directly connected to the radio frequency amplifier and detector circuits of sonar receiver and readout system 15.

The output of T.V.G. amplifier 42 is also connected to the input of a sonar transmitter 43, the output of which is coupled to the input of an electroacoustical transducer 44. Transducer 44 is so designed as to broadcast acoustical energy 45 throughout a predetermined subaqueous medium 46, such as water, sea water, or other acoustic coupling medium, or the like, toward an electroacoustical receiving transducer 47 located therein. The output of transducer 47 is, of course, connected to the receiving and readout circuits of the aforesaid sonar receiver and readout system 15.

At this time, it should be understood that all of the elements shown in block form in FIG. 1 are well known and conventional per se. It should, therefore, also be understood that it is their unique interconnections and interactions that combine to effect the subject invention and its new and improved results.

A shadowgraph type of sonar, the type which this invention is intended to simulate, is a high resolution side-looking sonar designed for hunting and identifying target objects, such as mines and the like, lying on the sea floor or partially buried therein. The transmitting-receiving units thereof are usually towed in a bottom-following submarine vehicle, which normally maintains, for example, an altitude of fifteen feet from the sea floor and is usually towed at a speed of approximately six knots. Exemplarily speaking, such a sonar transmits fifty microsecond pulses thirty times a second for a maximum range of eighty-two feet. Moreover, the sonar transducers are usually focused on the bottom to provide a resolution of three inches.

The received sonar signal consists of echoes from irregularities of the bottom—this is, normal bottom reverberation—and strong echoes including highlights from objects proud of the bottom, immediately followed by the lack of any signal or shadows where the target object shades the bottom.

After being appropriately amplified and detected by the sonar receiver, the typical bottom reverberation has a peak amplitude of from three to four volts, the highlights typically have amplitude peaks of six volts or more, and of course, the shadows have zero voltage amplitude.

The length of the shadow is a function of the altitude of the vehicle, the height of the object, and the range to the object. The length of the idealized shadows may be expressed mathematically by $$S_L = \frac{h}{2.5}\left[1 + \left(\frac{r}{a-h}\right)^2\right]^{\frac{1}{2}}, \quad (1)$$

where
$S_L$ = shadowlength in milliseconds,
$h$ = height of the target object in feet,
$a$ = the altitude above the sea floor in feet at which the sonar transducer is located, and
$r$ = horizontal range from sonar transducer to target object in feet.

The number of sonic pulses intercepted by the target is a function of the target length, the speed of the submarine vehicle, the orientation of the target with respect to the vehicle, the width of the target, and the pulse rate of the sonar. The number of sonic pulses intercepted by the target may be ideally expressed mathematically by:

$$N = \left(\frac{3}{5}\right)\left(\frac{f}{v}\right)[L \cos \theta = w \sin \theta], \quad (2)$$

where

N=number of sonic pulses intercepted,
f=sonar pulse repetition rate in pulses per second,
v=speed of submarine vehicle in knots,
L=length of target in feet,
w=width of target in feet, and
θ=the intersecting angle between the long axis of the target and the heading of the submarine vehicle in degrees.

The aforementioned equations may be used to determine some of the more critical basic functions necessary to be incorporated in the invention, if the simulations produced thereby are to appear realistic to a human operator. From them, their respective simulating elements have been designed, after which they have been uniquely combined as shown in FIG. 1 to effect the system illustrated therein. As a result, the following sonar target characteristics will be simulated:

1. Normal bottom reverberation, which may be varied in amplitude from, say, zero to five volts;
2. Target highlights, which may be varied from, say, zero to twenty volts;
3. A target shadow, which may be varied from, say, 0.5 to 12 milliseconds;
4. Submarine vehicle altitude, which may be varied from, say, 9 to 35 feet;
5. Target range, which may be varied from, say, zero to the approximate maximum of 82 feet.
6. Target aspect, which may be varied from parallel to vehicle track to an angle of approximately eighty degrees therefrom; and
7. The number of target pulses intercepted by the sonar, which is variable more or less as desired from none to a predetermined maximum.

With the foregoing in mind, the operation of the subject invention will now be discussed in conjunction with FIGS. 1 and 2 of the drawing.

As indicated in FIG. 1, sawtooth generator 22 simulates the number of target contacts which are to be inspected by a human operator or sonar trainee using the simulator system. Although sawtooth generator 22 is actually a free-running generator, the approximate frequency thereof is manually adjustable, as is common practice with such devices. At this time, however, it should be noteworthy that this particular sawtooth generator should be designed to have a very low frequency compared to that of the aforementioned reference sawtooth generator 11. Though the respective frequencies of generators 22 and 11 are a matter of design choice, with the choice thereof contingent upon the situations desired to be simulated at any given instant, it has been found in actual practice that designing sawtooth generator 11 to have a frequency which is 100 times that of sawtooth generator 22 provides eminently satisfactory operation, because with such design, the frequency of sawtooth generator 22 is indeed low compared to that of reference sawtooth generator 11. For the purpose of simplifying the disclosure of this invention and its operation, however, (especially in FIG. 2 of the drawing) the frequency relationship between the aforementioned generator frequency has been made 7 to 1, instead of 100 to 1. An inspection of FIGS. 2(a) and 2(c) will disclose the exemplary relationship used herein for disclosure purposes.

The frequency of sawtooth generator 22, as shown in FIG. 2(a) controls the simulation of contacts with targets as previously suggested, and it also provides a predetermined sawtooth amplitude which is compatible with the components responsive thereto. Said amplitude is sufficiently great to cross the control trigger voltage of Schmitt trigger 24, represented by the dotted line portion of FIG. 2(a); and when such crossing occurs, Schmitt trigger 24 changes from an unactuated state to an actuated state, where it is held for such period of time that said sawtooth voltage drops below the trigger voltage of said Schmitt trigger. The aforesaid voltage crossing is, of course, adjustable and may, thus, be varied by adjusting the trigger voltage of Schmitt trigger 24.

The resulting output of Schmitt trigger 24, as may be seen from FIG. 2(b), is essentially a long negative squarewave type of signal, the period of which is as long as the time the voltage of the aforesaid sawtooth signal exceeds said preset trigger voltage; and this period represents both the contact with a simulated target and the length of time the target is actually simulated. In effect, then, it may be seen that the frequency of the output signal from sawtooth generator 22 determines the number of target contact simulations which occur within any given time period, and the sawtooth signal period represents the time between successive automatic sonar contacts. As also may be seen from the inspection of FIG. 2, all sonar target simulations are actually produced between the actuation and deactivation of Schmitt trigger 24.

Selector switch 25 is the type of switch which may be manually operated to select either the output from Schmitt trigger 24 or a predetermined direct-current voltage output from manual target generator 26 and supply it to the input of gated Schmitt trigger 28. Said D.C. voltage is, of course, manually preset so that it will gate Schmitt trigger 28 to an operative condition for a predetermined period of time, thereby simulating a single target for that time period. Within that time period in which it is allowed to operate, Schmitt trigger 28 will also be actuated by the sawtooth output signal from reference sawtooth generator 11, whenever the voltage thereof exceeds the voltage represented by the dotted line of FIG. 2(c) which, in turn, represents the output signal from target range voltage adjust network 31.

The dotted line sawtooth waveform of FIG. 2(c) is substantially similar to the solid line sawtooth waveform of FIG. 2(a), but due to the adjustability of target aspect adjust potentiometer 29 and the adjustability of target range voltage adjust network 31, the actual amplitude thereof may or may not be different from the idealized representation of the amplitude of the sawtooth of FIG. 2(a). Adjustment of the dotted line sawtooth of FIG. 2(c), either by potentiometer 29 and/or network 31 effects simulation of target aspect and target range individually or in combination as desired. Accordingly, Schmitt trigger 28 is timely gated to produce positive squarewave signals having time periods which are equal to the time periods the output voltage from reference sawtooth generator 11 exceeds the output voltage of network 31. Typical examples of such positive squarewave signals are depicted in the waveform of FIG. 2(d).

Reference sawtooth generator 11 produces a regularly recurring sawtooth signal at a free-running repetition rate. Like the aforementioned sawtooth generator 22, its free-running repetition rate may be varied so that it will operate at essentially some predetermined frequency. As previously mentioned, this sawtooth signal is ideally represented by the solid line of FIG. 2(c). Because it is supplied to differentiator 13, it is differentiated in such manner that an output pulse similar to that shown in FIG. 2(i) is produced simultaneously with the negative slope thereof, thereby forming a pulse which effects synchronization of the aforesaid reference sawtooth generator 11 with said sonar receiver and readout system 15. Of course, sawtooth generator 11 may be directly synchronized with sonar receiver and readout system 15, if so desired, and, accordingly, it is shown as being connected thereto for that purpose in the block diagram of FIG. 1.

The output pulse from differentiator 13, in turn, triggers monostable multivibrator 14 into its unstable state, where it remains for the length of time typically depicted by the positive squarewave portion in the waveform of FIG. 2(j). Because monostable multivibrator 14 is manually adjustable, said positive portion of the squarewave of FIG. 2(j) may be varied in length; likewise, the length of time monostable multivibrator 14 remains in its unstable state may be varied. After such adjustment is made, the unstable state period represents the time period that occurs between the transmission of the sonar search signal and the reception of the first echo signal from the sea floor. Hence, it also represents the height above or range to said sea floor.

The output from multivibrator 14 biases gate amplifier 16 to a closed condition during the unstable state period thereof, so that a band-limited noise, ideally represented by FIG. 2(k), from noise generator 17 cannot pass through gate amplifier 16 during the time between the aforementioned transmission simulation and the simulated reception of the return of the first echo from the ocean bottom. In other words, gate amplifier 16 is kept closed for a certain period of time, which represents range to the sea floor; hence, no simulated bottom reverberation can occur during that time, because the noise signal output representing said reverberation is blocked. But after the unstable state period of monostable multivibrator 14 has expired, gate 16 is opened allowing bottom noise reverberations from generator 17 to pass to gate amplifier 19. The resulting waveform, at that particular time, acquires the appearance of that typically shown in FIG. 2(l). At gate amplifier 19, said waveform is again gated in accordance with other simulations preset into the total system, the discussion of which will now continue.

Referring back to gated Schmitt trigger 28, the edges of the positive portions of the output thereof, represented by FIG. 2(d) is differentiated by differentiator 33, and so doing produces a waveform substantially similar to that shown in FIG. 2(e). The positive pulses thereof actuate monostable multivibrator 34 to an unstable state for the predetermined time periods set therein. These periods are shown as the positive portions of the squarewave depicted in FIG. 2(f), since the waveform thereof represents the output of monostable multivibrator 34 and, hence, the length of the target shadow being incorporated in the subject system at that time.

The output of target shadow length circuit 32 shown in FIG. 2(f) acts as the gating signal for the aforementioned gate amplifier 19. Consequently, during the positive portion thereof, gate 19 is closed, and the signal having a waveform similar to that shown in FIG. 2(m) results. Of course, the lack of noise in the waveform thereof at this particular gating period simulates the target shadow being inserted in the system.

The output of monostable multivibrator 34 is fed to differentiator 38 where either the leading edge or the lagging edge thereof is differentiated, depending on the manual setting of switch 36. The former is represented by FIG. 2(g) and the latter by FIG. 2(h), with the latter occurring as a result of phase inversion taking place in phase inverter 35. For simplicity of disclosure, only the leading edge processing will herewith be discussed, inasmuch as processing the lagging edge is identical thereto.

Differentiation of the leading edge of the waveform of FIG. 2(f), as previously mentioned, produces the waveform of FIG. 2(g), and the pulses thereof are used to simulate the reception of sonar targets, including target highlights. These pulses are mixed with the output from gate amplifier 19 in mixer 21. After rectification by diode rectifier 39, the resulting signal acquires an appearance similar to the waveform of FIG. 2(n). As may readily be seen therein, the actual target simulations timely appear as the greater amplitude pulses which occur at the same time that the aforementioned positive pulses of the waveform of FIG. 2(g) occur. The output from rectifier 39 is directly applied to sonar and readout system 15 for further processing thereby, in the event the frequency and target simulations thereof are as desired for operator training purposes. On the other hand, if radio frequencies of the proper amplitude are desired, the signal of FIG. 2(n) is used to drive and gate gated RF oscillator 41 for production of the waveform exemplarily shown in FIG. 2(o). While FIGS. 2(n) and 2(o) may appear to have similar frequencies, it should be understood that, due to the physical limitations inherently existing in patent drawings, it is impossible to illustrate two relatively high frequencies as they really are. Suffice it to say, then, the RF output frequency from oscillator 41 is much higher than that of the output of diode rectifier 39.

After being gain controlled in time-varied-gain amplifier 42 to give the signal of FIG. 2(o) a more natural appearance, it looks approximately like that depicted in FIG. 2(p). This signal is then supplied to the amplifier and detector circuits of sonar receiver and readout system 15 for further processing in the manner that real sonar signals are usually processed thereby. In addition, said signal is broadcast as acoustical energy 45 by transmitter 43 and transducer 44 through sea water 46 or the like, so that actual water-added characteristics will be incorporated therein and make it have an even more realistic appearance. Reception thereof by receiving transducer 47 and processing by sonar receiver and readout system 15 then effects the final processing, so as to achieve a relatively high fidelity simulation of the target characteristics set into the subject sonic echo simulator.

In summary, then, it may readily be seen that the aforementioned generated sonar target characteristics are timely illustrated by the following waveforms;
1. Normal bottom reverberation characteristics by FIG. 2(k);
2. Target highlights characteristics by FIG. 2(g);
3. Target shadow characteristics by FIG. 2(f);
4. Submarine vehicle altitude characteristics by FIG. 2(j);
5. Target range characteristics by the dotted line of FIG. 2(c);

6. Target aspect characteristics by the solid line of FIG. 2(a); a
7. The number of sonar targets intercepted by FIG. 2(a).

Of course, the composite of all of the foregoing simulated target characteristics is typically depicted by FIG. 2(p). Obviously, they may be as varied as there are commutations and permutations of target characteristics available to be preset into the subject system by the operator or trainee. In any event, a simulated sonar target having a very realistic appearance is produced by this invention, which facilitates the training of sonar personnel without the necessity of their being exposed to real operational conditions or tieing up real and associated equipment.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sonic echo simulator comprising in combination:
   means for generating a first sawtooth signal having a predetermined frequency;
   means for generating a second sawtooth signal having a predetermined frequency that is high compared to the aforesaid predetermined frequency of said first sawtooth signal;
   means connected to the output of said first sawtooth signal generating means for varying the sawtooth slope amplitude of said first sawtooth signal in accordance with a preselected target aspect characteristic;
   means connected to the output of said first sawtooth signal slope amplitude varying means for adjusting the entire voltage level of said sawtooth slope amplitude varied signal in accordance with a preselected target range characteristic;
   means connected to the output of said first sawtooth signal generating means for selectively producing a gating signal representing the length of a submarine target;
   means connected to the outputs of said second sawtooth generating means, said target range voltage level adjusting means, and the aforesaid gating signal producing means for producing a first composite output signal representing preselected target aspect, target range, and target length;
   means connected to the output of said first composite output signal producing means for the modification thereof in such manner as to incorporate a target shadow length therein, and, thus, produce a second composite signal containing target aspect, target range, target length, and target shadow length therein;
   means connected to the output of said second composite signal producing means for the conversion thereof to a third composite signal containing target aspect, target range, target length, target shadow length, and target highlights;
   means connected to the output of said second sawtooth generator for producing a gating signal representing range to the sea floor;
   means connected to the output of said range to sea floor gating signal producing means for generating simulated sea floor acoustical reverberation signals which have been gated to delete the occurrence thereof for a predetermined time period proportional to twice the aforesaid range to sea floor in response to the aforesaid gating signal;
   means connected to the output of said gated simulated sea floor acoustical reverberation signals generating means and to the output of said second composite signal producing means for the gating of said gated simulated sea floor acoustical reverberation signals by the aforesaid second composite signal, in order to effect a fourth composite signal;
   means connected to the output of said second composite signal producing means and said fourth composite signal effecting means for mixing the respective second and fourth composite signals therefrom to, in turn, form a fifth composite signal; and
   a sonar receiver and readout system having a plurality of inputs, with one of the inputs thereof effectively connected to the output of said second and fourth composite signal mixing means for oral and visual readout of said fifth composite signal.

2. The device of claim 1 wherein said means connected to the output of said first sawtooth signal generating means for varying the sawtooth slope amplitude of said first sawtooth signal in accordance with a preselected target aspect characteristic is a variable potentiometer.

3. The device of claim 1 wherein said means connected to the output of said first sawtooth signal slope amplitude varying means for adjusting the voltage level of said sawtooth slope amplitude varied signal in accordance with a preselected target range characteristic comprises an adjustable direct current voltage divider network.

4. The device of claim 1 wherein said means connected to the output of said first sawtooth signal generating means for selectively producing a gating signal representing the length of a submarine target is a Schmitt trigger.

5. The device of claim 1 wherein said means connected to the output of said second sawtooth generating means, said target range voltage level adjusting means, and the aforesaid gating signal producing means for producing a first composite output signal representing preselected target aspect, target range, and target length, is a gated Schmitt trigger.

6. The device of claim 1 wherein said means connected to the output of said first composite output signal producing means for the modification thereof in such manner as to incorporate a target shadow length therein, and, thus, produce a second composite signal containing target aspect, target range, target length, and target shadow length therein comprises:
   a differentiator; and
   a monostable multivibrator connected to the output of said differentiator.

7. The device of claim 1 wherein said means connected to the output of said second composite signal producing means for the conversion thereof to a third composite signal containing target aspect, target range, target length, target shadow length, and target highlights comprises:
   a selector switch having a pair of inputs and an output, with one of the inputs thereof connected to the output of said second composite signal producing means;

a phase inverter connected between the output of said second composite signal producing means and the other input of said selector switch; and a differentiator connected to the output of said selector switch.

8. The device of claim 1 wherein said means connected to the output of said second sawtooth generator for producing a gating signal representing range to sea floor comprises:

a differentiator connected to the output of said second sawtooth generator; and a variable monostable multivibrator connected to the output of said differentiator.

9. The device of claim 1 wherein said means connected to the output of said range to sea floor gating signal producing means for generating simulated sea floor acoustical reverberation signals which have been gated to delete the occurrence thereof for a predetermined time period proportional to twice the aforesaid range to sea floor in response to the aforesaid gating signal comprises:

a gate amplifier having a pair of inputs and an output, with one of the inputs thereof connected to the output of said range to sea floor gating signal producing means; and a noise generator with the output thereof connected to the other input of the aforesaid gate amplifier.

10. The device of claim 1 further characterized by means connected between an output of said sonar receiver and readout system and the input of the aforesaid second sawtooth generator for the timely synchronization thereof therewith.

11. The device of claim 1 further characterized by a diode rectifier connected between the output of said second and fourth composite signal mixing means and an input of said sonar receiver and readout system.

12. The device of claim 1 further characterized by:

a gated radio frequency oscillator effectively connected to the output of said mixing means; and a time-varied-gain amplifier having an input and an output, with the input thereof connected to the output of said gated radio frequency oscillator, and the output thereof connected to one of the inputs of the aforesaid sonar receiver and readout system for oral and visual readout thereof.

13. The device of claim 12 further characterized by:

a sonar transmitter connected to the output of said time-varied-gain amplifier;

a transmitting transducer coupled to the output of said sonar transmitter; and a receiving transducer connected to one of the inputs of the aforesaid sonar receiver and readout system for receiving the signals transmitted by said transmitting transducer and supplying them thereto for readout thereby.

14. A sonic echo simulator comprising in combination:

a first sawtooth generator;

a target aspect adjustable potentiometer connected to the output of said first sawtooth generator;

a target range adjustable voltage network connected to the output of said target aspect adjustable potentiometer;

a Schmitt trigger connected to the output of said first sawtooth generator;

a manual target voltage generator;

a first selector switch with a pair of inputs and an output, with one of the inputs connected to the output of said manual target voltage generator and the other input thereof connected to the output of the aforesaid Schmitt trigger;

a second sawtooth generator;

a gated Schmitt trigger having a trio of inputs and an output, with one of the inputs thereof connected to the output of said target range adjustable voltage network, with another of the inputs thereof connected to the output of said selector switch, and with the remaining input thereof connected to the output of the aforesaid second sawtooth generator;

a first differentiator connected to the output of said gated Schmitt trigger, a first variable monostable multivibrator connected to the output of said first differentiator;

a second differentiator connected to the output of said second sawtooth generator;

a second variable monostable multivibrator connected to the output of said second differentiator;

a noise generator;

a first gate amplifier having a pair of inputs and an output, with one of the inputs thereof connected to the output of said second variable monostable multivibrator, and with the other input thereof connected to the output of said noise generator;

a second gate amplifier having a pair of inputs and an output, with one of the inputs thereof connected to the output of said first gate amplifier, and with the other input thereof connected to the output of said first variable monostable multivibrator;

a second selector switch having a pair of inputs and an output, with one of the inputs thereof connected to the output of said first monostable multivibrator;

a phase inverter connected between the output of said first monostable multivibrator and the other input of said second selector switch;

a third differentiator connected to the output of said second selector switch;

a mixer having a pair of inputs and an output, with one of the inputs thereof connected to the output of the aforesaid second gate amplifier, and with the other input thereof connected to the output of said third differentiator;

a diode rectifier connected to the output of said mixer;

a gated radio frequency oscillator connected to the output of said diode rectifier;

a time-varied-gain amplifier connected to the output of said gated radio frequency oscillator;

a sonar transmitter connected to the output of said time-varied-gain amplifier;

a transmitting transducer, adapted for being disposed in sea water, connected to the output of said sonar transmitter;

a receiving transducer adapted for being disposed in sea water for response to the output of the aforesaid transmitting transducer; and a sonar receiver and readout system having a plurality of inputs and an output, with one of the inputs thereof connected to the output of said receiving transducer, with another of the inputs thereof connected to the output of said time-varied-gain amplifier, and with still another of the inputs thereof connected to the output of the aforesaid diode rectifier for timely and selective oral and visual display of the respective output signals therefrom, as desired.

* * * * *